(12) United States Patent
Ganter et al.

(10) Patent No.: US 11,656,011 B2
(45) Date of Patent: May 23, 2023

(54) CONDENSER

(71) Applicant: HITACHI ENERGY SWITZERLAND AG, Baden (CH)

(72) Inventors: Philipp Ganter, Klettgau (DE); Francesco Agostini, Zürich (CH)

(73) Assignee: Hitachi Energy Switzerland AG, Baden (CH)

(*) Notice: Subject to any disclaimer, the term of this patent is extended or adjusted under 35 U.S.C. 154(b) by 0 days.

(21) Appl. No.: 16/748,050

(22) Filed: Jan. 21, 2020

(65) Prior Publication Data
US 2020/0232689 A1    Jul. 23, 2020

(30) Foreign Application Priority Data

Jan. 22, 2019 (EP) ..................... 19152951

(51) Int. Cl.
  *F28F 1/20* (2006.01)
  *F25B 39/04* (2006.01)
  *F28F 1/30* (2006.01)

(52) U.S. Cl.
  CPC .............. *F25B 39/04* (2013.01); *F28F 1/20* (2013.01); *F28F 1/30* (2013.01); *F25B 2339/045* (2013.01)

(58) Field of Classification Search
  CPC ...... F28F 1/022; F28F 1/20; F28F 1/22; F28F 1/126; F28D 1/0246; F28D 1/05366; F28D 1/024; F25B 39/04
  See application file for complete search history.

(56) References Cited

U.S. PATENT DOCUMENTS

| | | | |
|---|---|---|---|
| 4,144,933 A | | 3/1979 | Asselman et al. |
| 7,684,187 B1 | | 3/2010 | Meyer, IV et al. |
| 8,081,464 B2 | | 12/2011 | Mauroux et al. |
| 10,048,024 B1 | | 8/2018 | Sole et al. |
| 2001/0032718 A1 | * | 10/2001 | Sheerin ................ F28D 1/0233 165/130 |

(Continued)

FOREIGN PATENT DOCUMENTS

| CN | 2221767 Y | 3/1996 |
|---|---|---|
| CN | 2924461 Y | 7/2007 |

(Continued)

OTHER PUBLICATIONS

European Search Report dated Jul. 3, 2019 for European Patent Application No. 19152951.0, 2 pages.

(Continued)

*Primary Examiner* — Eric S Ruppert
(74) *Attorney, Agent, or Firm* — Sage Patent Group

(57) ABSTRACT

A condenser includes a fluid inlet in an upper manifold and a fluid outlet in a lower manifold. The condenser includes multiport tubes provided with a plurality of separate flow channels which are delimited by outer opposite side walls and internal intermediate walls extending between the outer opposite side walls of the tubes. The multiport tubes define a channel space between them. A plurality of cooling plates extend between the upper manifold and the lower manifold. The cooling plates are in thermal contact with the multiport tubes to receive a heat load from fluid in the flow channels. The cooling plates have outer edges which protrude out from the channel space and are directed away from the channel space.

7 Claims, 3 Drawing Sheets

(56) References Cited

U.S. PATENT DOCUMENTS

| | | | |
|---|---|---|---|
| 2001/0040025 A1* | 11/2001 | Jurisich | F28F 3/048 165/148 |
| 2004/0069013 A1* | 4/2004 | Aflekt | F28D 1/0477 62/507 |
| 2004/0163798 A1 | 8/2004 | Ghosh et al. | |
| 2008/0072614 A1 | 3/2008 | Bhatti et al. | |
| 2011/0127011 A1 | 6/2011 | Agostini et al. | |
| 2011/0139420 A1 | 6/2011 | Wang | |
| 2011/0139425 A1 | 6/2011 | Beamer | |
| 2015/0027161 A1 | 1/2015 | Ohtani et al. | |
| 2020/0217588 A1* | 7/2020 | Komiya | F28D 1/05383 |

FOREIGN PATENT DOCUMENTS

| | | | |
|---|---|---|---|
| CN | 101936670 A | | 1/2011 |
| CN | 102829668 A | * | 12/2012 |
| CN | 206540340 U | | 10/2017 |
| CN | 107726674 A | * | 2/2018 |
| CN | 110998201 A | | 4/2020 |
| EP | 1832831 A2 | | 9/2007 |
| EP | 1832833 A2 | | 9/2007 |
| EP | 1860523 A2 | | 11/2007 |
| EP | 2157590 A1 | | 2/2010 |
| EP | 2894427 A1 | * | 7/2015 ............... F28F 1/02 |
| FR | 2843448 A1 | * | 2/2004 ............. F28F 9/182 |
| JP | H03-96574 U | | 10/1991 |
| JP | 2010065873 A | * | 3/2010 |
| JP | 4542552 B2 | | 9/2010 |
| WO | WO-2018185824 A1 | * | 10/2018 ............. F25B 39/02 |

OTHER PUBLICATIONS

Chinese First Office Action dated Mar. 25, 2021 for Chinese Patent Application No. 202010075255.X, 4 pages (including English translation).

Chinese Second Office Action dated Sep. 29, 2021 for Chinese Patent Application No. 202010075255.X, 15 pages (including English translation).

Wu, Yezhenget al., Refrigeration Principle and Equipment, edition 4, Xi'an Jiaotong University Press, Dec. 31, 2015 (English relevance for this citation is provided here: The Non-Patent Literature shows the basic structure of a parallel flow condenser in which fins are provided between multiport flat tubes. The examiner cited the Non-Patent Literature to try to prove that it is a conventional design in the art that the channel space is provided with fins extending between the outer side walls of the multiport tubes and side surfaces of the cooling plates.).

* cited by examiner

CONDENSER

RELATED APPLICATION

This application claims priority under 35 U.S.C. § 119 from European Patent Application No. 19152951.0, filed on Jan. 22, 2019, the disclosure of which is hereby incorporated by reference herein as if set forth in its entirety.

BACKGROUND

The inventive concepts relate to a condenser for dissipating heat into surroundings.

Condensers are used for receiving heated fluid in order to cool the fluid by dissipating excess heat to surroundings.

A challenge with condensers is to obtain a design which is simple enough for cost effective mass production simultaneously, as the condenser is able to efficiently dissipate heat with a high-power density.

SUMMARY

A condenser according to some embodiments includes a fluid inlet in an upper manifold and a fluid outlet in a lower manifold. The condenser includes multiport tubes provided with a plurality of separate flow channels which are delimited by outer opposite side walls and internal intermediate walls extending between the outer opposite side walls of the tubes. The multiport tubes define a channel space between them. A plurality of cooling plates extend between the upper manifold and the lower manifold. The cooling plates are in thermal contact with the multiport tubes to receive a heat load from fluid in the flow channels. The cooling plates have outer edges which protrude out from the channel space and are directed away from the channel space.

Use of multiport tubes in combination with cooling plates with edges having outer ends protruding out from a channel space defined between the multiport tubes makes it possible to obtain a condenser which may be both simple and inexpensive to manufacture.

BRIEF DESCRIPTION OF DRAWINGS

In the following disclosure, embodiments will be described in closer detail by way of example and with reference to the attached drawings, in which.

DESCRIPTION OF EMBODIMENTS

Figure 1:
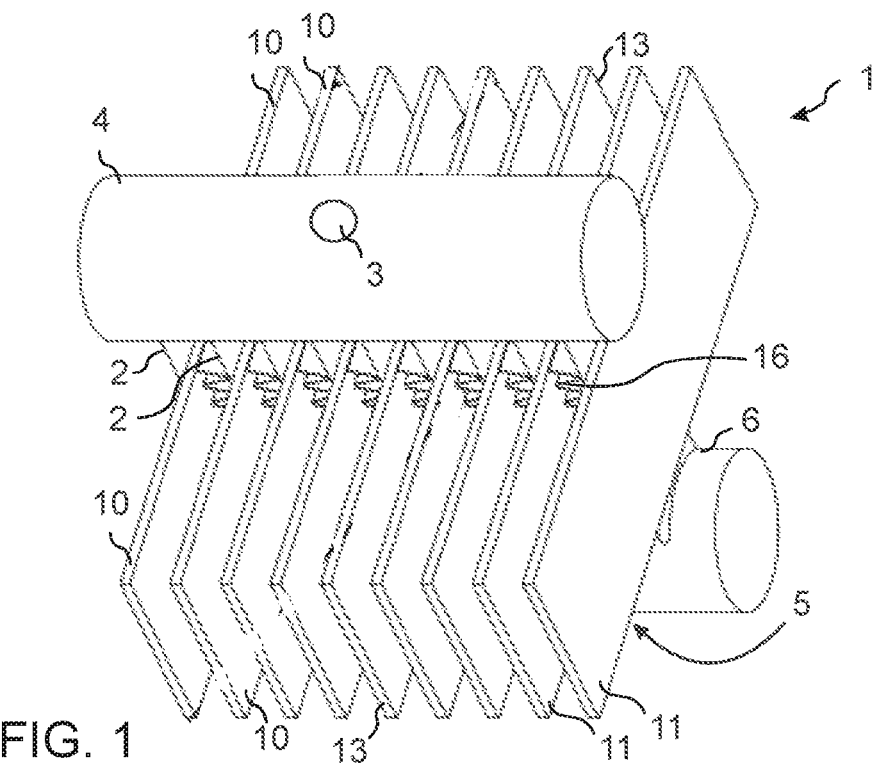
FIGS. 1 to 3 illustrate a first embodiment of a condenser.
Figure 2:
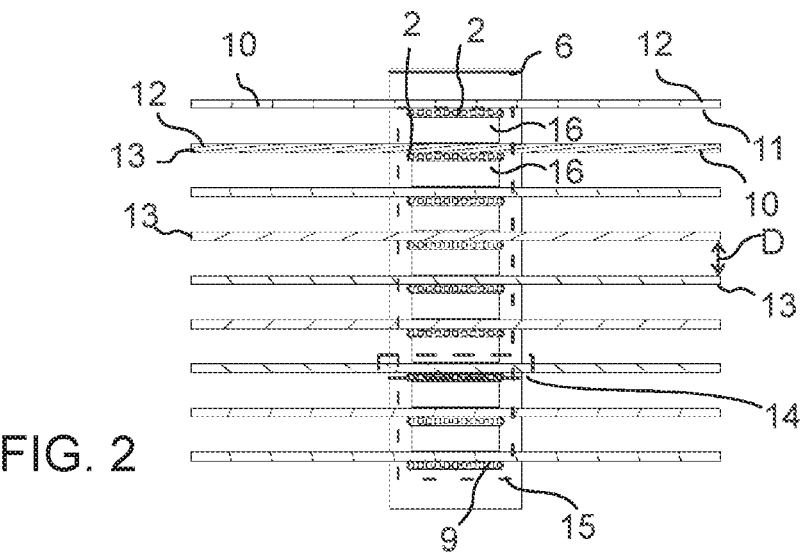
Figure 3:
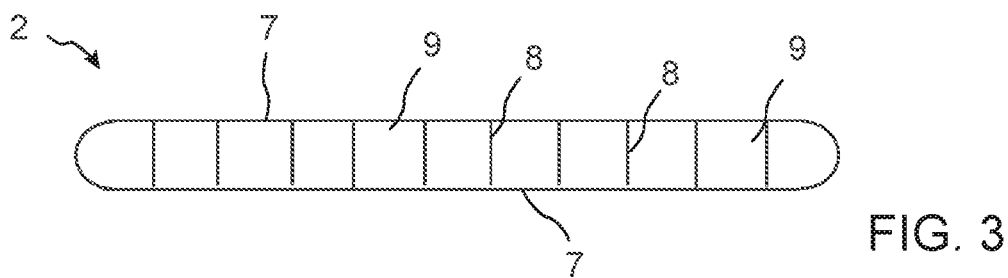

FIGS. 1 to 3 illustrate a first embodiment of a condenser. FIG. 1 illustrates the condenser 1 from above, FIG. 2 is a partial cross-section of the condenser of FIG. 1, and FIG. 3 is an end view of a multiport tube 2 used in the condenser 1 of FIGS. 1 and 2.

The illustrated condenser 1 comprises an upper manifold 4 with a fluid inlet 3 for receiving fluid. Depending on the implementation the heated fluid may originate from an evaporator, for instance. The lower manifold 6 is provided with a fluid outlet 5 as illustrated in one of FIGS. 6-8, for instance. A plurality of multiport tubes 2 extend between the upper manifold 4 and lower manifold 6. These multiport tubes 2 provide a flow path between the upper manifold 4 and the lower manifold 6 such that fluid having entered the condenser 1 via the inlet 3 may exit the condenser via the outlet 5 to said evaporator, for instance. The evaporator may in that case be an evaporator cooling a circuit breaker of a generator or any other high current or high voltage device.

FIG. 3 illustrates an end view of one multiport tube 2. The multiport tube is provided with opposite outer side walls 7 and internal intermediate walls 8 extending between the outer side walls 7. The intermediate walls 8 divide the multiport tube into a plurality of separate flow channels 9. The diameter (or height and width) of the internal flow channels 9 may be between 0.1 mm and 10 mm and the burst pressure of the fluid received into the upper manifold may be between 1 and 120 bar, for instance. This facilitates use of many alternative refrigerants as fluids. The multiport tubes may be manufactured of aluminum by extrusion, for instance.

The condenser 1 illustrated in FIGS. 1 to 3 is also provided with a plurality of cooling plates 10 extending between the upper manifold 4 and the lower manifold 6. In praxis it is not necessary for the cooling plates 10 to directly contact the manifolds, however, in order to maximize their area, preferably they extend as close to the upper and lower manifolds as possible. In the illustrated embodiment, each cooling plate 10 has a side surface 11 contacting one outer side wall 7 of one multiport tube 10. In this way the cooling plates 10 are in thermal contact with the multiport tubes 10 such that they efficiently receive a heat load from fluid in the fluid channels 9. The cooling plates 10 may be metal plates attached to the multiport tubes by brazing, for instance. The spacing D between the parallel cooling plates 10 and the number of cooling plates can be adjusted according to the required cooling requirements to obtain a sufficient heat dissipating surface area. Preferably the spacing between the cooling plates 10 is optimized for natural convection in order to obtain a natural convection condenser, where airflow between the plates may occur due to gravity without a need to utilize a fan. In order to facilitate efficient airflow due to natural convection the spaces between the cooling plates 10 are preferably open upwards and downwards. Consequently, the condenser does not have any obstacles preventing airflow upwards from the spaces between the cooling plates in the parts of the plates that protrude out from the channel space 15.

Figure 6:
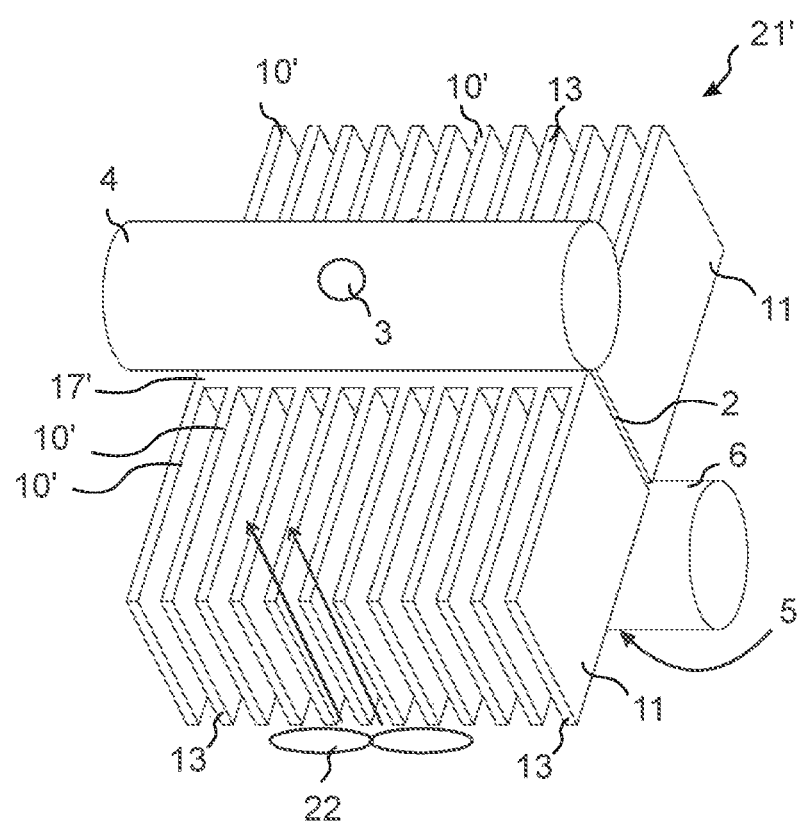
FIG. 6 illustrates a third embodiment of a condenser.

However, in some implementations the airflow between the cooling plates 10 may be assisted by a fan, as illustrated in the embodiment of FIG. 6, for instance. In that case the fan may be directed to generate a vertical flow between the cooling plates (as in FIG. 6) or alternatively directed to generate horizontal air flow between the cooling plates, in which case the air flows also between the fins 16.

The multiport tubes 2 are arranged to the condenser 1 in such a way that they define a channels space 15 between them, such that all flow channels 9 are located within this channel space, as illustrated in FIG. 2. The cooling plates are dimensioned such that their outer edges 13 protrude out of this channel space 15. In the example of FIGS. 1 to 2, the cooling plates are arranged such that only their intermediate (middle) sections 14 are located in the channel space 15, while the outer opposite edges 13 protrude out from the channel space. In this way the area of the side surfaces 11 of the cooling plates becomes significantly large, such that efficient dissipation of the heat load received from fluid in the channels 9 can be obtained. Consequently, the thickness of the condenser is not defined by the width of the upper and lower manifolds, but instead by the distance between the opposite outer edges 13 of the cooling plates.

During operation, a large pressure drop in the channels 9 of the multiport tubes 2, as compared to the pressure drop in the manifold, will force the fluid in vapor state entering the upper manifold 4 to a homogeneous flow distribution between the different channels 9 of all multiport tubes. In praxis the pressure drop in the channels is significantly larger than in the manifold. The result is a high thermal effectiveness, because of the homogeneous vapor distribution to all channels of the multiport tubes.

In FIGS. 1 and 2, the condenser 1 has a parallel configuration, where the cooling plates 10 have their side surfaces 10 in parallel with the outer side wall 7 of the multiport tubes 2.

To provide additional rigidity to the condenser 1 and also to increase heat dissipation, fins 16 are arranged in the channel space 15 to extend between the outer side walls 7 of the multiport tubes 2 and the side surfaces 12 of the cooling plates 10. Consequently, in the illustrated embodiment these fins are used to make the structure more robust.

The condenser 1 illustrated in FIGS. 1 and 2 is capable to work as a two-phase natural convection condenser. No pump is needed to pass fluid from the upper manifold 4 to the lower manifold 6, as the fluid entering the upper manifold 4 as vapor, may condense to a liquid due to the heat dissipation from the cooling plates 2, and due to gravity end up in the lower manifold 6. Additionally, due to the relatively large surface area of the cooling plates 10, no fan is needed to create an airflow between the cooling plates. Therefore, the condenser can be used in a passive system without such a pump or fan. However, naturally the condenser can also be used in a system including a fluid pump and/or a fan.

Figure 4:
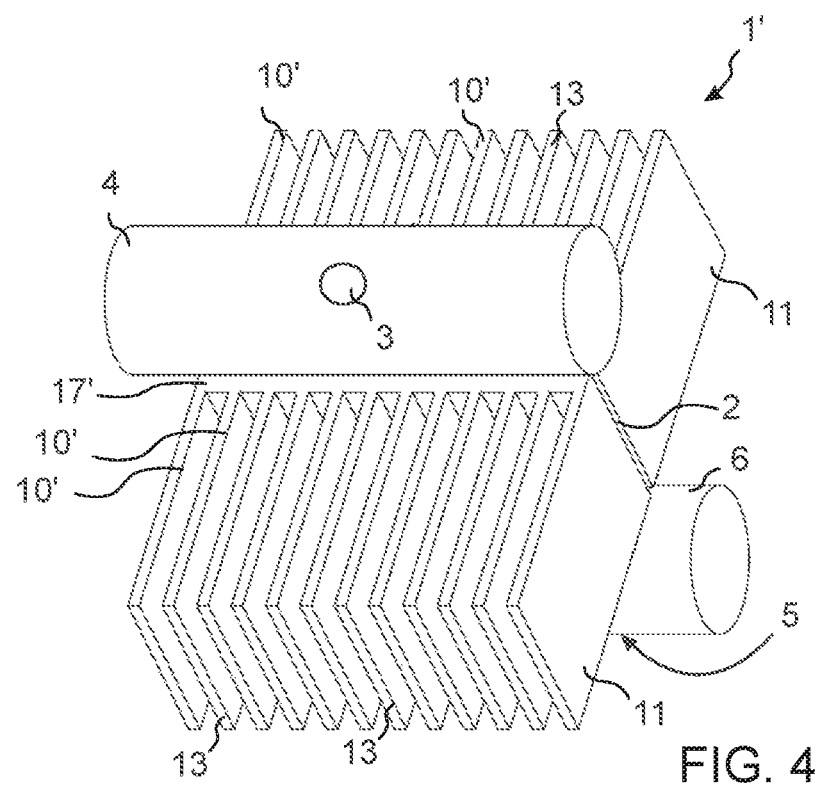
FIGS. 4 to 5 illustrate a second embodiment of a condenser.
Figure 5:
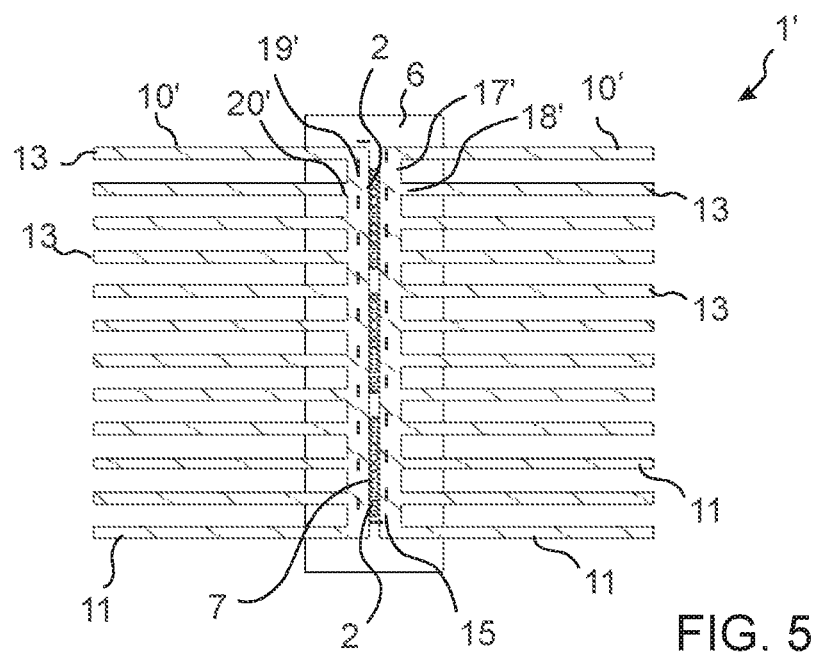

FIGS. 4 to 5 illustrate a second embodiment of a condenser. The embodiment of FIGS. 4 to 5 is very similar to the one explained in connection with FIGS. 1 to 3. Therefore, the embodiment of FIGS. 4 to 5 is mainly explained by pointing out the differences between these embodiments.

FIG. 4 illustrates the condenser 1' from above and FIG. 5 is a partial cross-section of the condenser of FIG. 4. In the embodiment of FIGS. 4 and 5, the condenser 1' has a perpendicular configuration, where the cooling plates 10' have side surfaces 11 that are perpendicular to the outer side walls 7 of the multiport tubes 2.

Similarly, as in the previous embodiment, the cooling plates 10' are dimensioned such that their outer edges 13 protrude out of the channel space 15. However, a first base 17' is attached to extend along the outer side walls 7 of the multiport tubes 2 on a first side of the multiport tubes 2. A second inner edge 18' of the parallel cooling plates 10' extending in a first direction (to the right in FIG. 5) are attached to this first base 17'. Correspondingly, a second base 19' is attached to extend along the outer side walls 7 of the multiport tubes 2 on a second side of the multiport tubes 2. A second inner edge 20' of the parallel cooling plates 10' extending in a second direction (to the left in FIG. 5) are attached to this second base 19'. The first base 17' and second base 19' may be implemented as a metal plate, for instance. In this way, heat originating from fluid in the channels of the multiport tubes 2 is conducted via the first base 17' and second base 19' to the cooling plates 10' from where the heat load is dissipated to the surroundings.

FIG. 6 illustrates a third embodiment of a condenser. The embodiment of FIG. 6 is very similar to the one explained in connection with FIG. 4. Therefore, the embodiment of FIG. 6 is mainly explained by pointing out the differences between these embodiments. In FIG. 6 the condenser 21' is provided with a fan 22 generating an airflow between the cooling plates 13. In the illustrated embodiment the fan 22 is directed to generate a vertical airflow between the plates 13 such that the air flows upwards. Consequently, the airflow upwards generated by natural convection due to heat that is dissipated via the plates to the surrounding air is assisted by the fan 22 which generates the airflow in the same direction.

It is to be understood that the above description and the accompanying figures are only intended to illustrate certain embodiments that can be varied and modified without departing from the scope of the inventive concepts.

The invention claimed is:

1. A condenser, comprising:
   a fan;
   a fluid inlet in an upper manifold, wherein the fluid inlet is configured to render fluid entering;
   a fluid outlet in a lower manifold, wherein the fluid outlet is configured to render fluid exiting;
   a plurality of multiport tubes extending between the upper and lower manifold, wherein the multiport tubes are provided with a plurality of separate flow channels which are delimited by outer opposite side walls and internal intermediate walls extending between the outer opposite side walls of the tubes, the multiport tubes providing a flow path between the upper manifold and the lower manifold, wherein the multiport tubes define a channel space between the multiport tubes;
   a plurality of cooling plates extending between the upper manifold and the lower manifold, wherein the cooling plates are in thermal contact with the multiport tubes to receive a heat load from fluid in the flow channels;
   the cooling plates having outer edges which protrude out from the channel space and are directed away from the channel space;
   the outer edges of the cooling plates extending outwardly beyond a periphery of a space defined between the upper manifold and the lower manifold;
   the condenser having a perpendicular configuration with the plurality of cooling plates that have side surfaces which are perpendicular to the outer opposite side walls of the multiport tubes;
   first ones of the plurality of cooling plates having their outer edges protruding out from the channel space in a first direction having a first inner edge attached to a first base attached to and extending along first outer side walls of the multiport tubes by brazing;
   second ones of the plurality of cooling plates having their outer edges protruding out from the channel space in a second direction having a second inner edge attached to a second base attached to and extending along second outer side walls of the multiport tubes by brazing;
   the first ones of the plurality of cooling plates and the second ones of the plurality of cooling plates being attached to each other via being attached to the multiport tubes by brazing without using any other fasteners to connect the first ones of the plurality of cooling plates and the second ones of the plurality of cooling plates;
   each of the plurality of multiport tubes being sandwiched between the first ones of the plurality of cooling plates and the second ones of the plurality of cooling plates with a corresponding outermost multiport tube among the multiport tubes being exposed by a corresponding slit formed between a corresponding outermost cooling plate among the first ones of the plurality of cooling plates and a corresponding outermost cooling plate among the second ones of the plurality of cooling plates and extending between the upper manifold and the lower manifold; and the fan being configured to generate a fan assisting airflow between the cooling plates along the flow path in a direction from the fluid outlet towards the fluid inlet.

2. The condenser according to claim 1, wherein the condenser comprises a natural convection condenser.

3. The condenser according to claim 1, wherein the condenser receives fluid from and passes fluid to an evaporator cooling a high current or voltage device.

4. A condenser, comprising:
a fan;
a first manifold;
a second manifold;
a fluid inlet in the first manifold, wherein the fluid inlet is configured to render fluid entering;
a fluid outlet in the second manifold, wherein the fluid outlet is configured to render fluid exiting;
a plurality of multiport tubes extending between the first and second manifolds, wherein the multiport tubes are provided with a plurality of separate flow channels that provide a flow path between the first manifold and the second manifold;
a plurality of cooling plates extending between the first manifold and the second manifold, wherein the cooling plates are in thermal contact with the multiport tubes to receive a heat load from fluid in the flow channels;
the cooling plates having opposite outer edges which extend outwardly away from the multiport tubes beyond a periphery of a space defined between the first manifold and the second manifold;
the condenser having a perpendicular configuration with the plurality of cooling plates that have side surfaces which are perpendicular to outer opposite side walls of the multiport tubes,
first ones of the plurality of cooling plates having their outer edges protruding out from a channel space in a first direction having a first inner edge attached to a first base attached to and extending along first outer side walls of the multiport tubes by brazing;
second ones of the plurality of cooling plates having their outer edges protruding out from the channel space in a second direction having a second inner edge attached to a second base attached to and extending along second outer side walls of the multiport tubes by brazing;
the first ones of the plurality of cooling plates and the second ones of the plurality of cooling plates being attached to each other via being attached to the multiport tubes by brazing without using any other fasteners to connect the first ones of the plurality of cooling plates and the second ones of the plurality of cooling plates;
each of the plurality of multiport tubes being sandwiched between the first ones of the plurality of cooling plates and the second ones of the plurality of cooling plates with a corresponding outermost multiport tube among the multiport tubes being exposed by a corresponding slit formed between a corresponding outermost cooling plate among the first ones of the plurality of cooling plates and a corresponding outermost cooling plate among the second ones of the plurality of cooling plates and extending between the first manifold and second manifold; and
the fan being configured to generate a fan assisting airflow between the cooling plates along the flow path in a direction from the fluid outlet towards the fluid inlet.

5. The condenser of claim 4, wherein the multiport tubes define the channel space between the multiport tubes, and wherein the cooling plates comprise the outer edges that protrude out from the channel space and are directed away from the channel space.

6. A condenser, comprising:
a fan;
a first manifold;
a second manifold;
a fluid inlet in the first manifold, wherein the fluid inlet is configured to render fluid entering;
a fluid outlet in the second manifold, wherein the fluid outlet is configured to render fluid exiting;
a plurality of multiport tubes extending between the first and second manifolds, wherein the multiport tubes are provided with a plurality of separate flow channels that provide a flow path between the first manifold and the second manifold;
a first plurality of cooling plates and a second plurality of cooling plates extending between the first manifold and the second manifold, wherein the first plurality of cooling plates and the second plurality of cooling plates are in thermal contact with the multiport tubes to receive a heat load from fluid in the flow channels;
the first plurality of cooling plates and the second plurality of cooling plates having opposite outer edges which extend outwardly away from the multiport tubes beyond a periphery of a space defined between the first manifold and the second manifold;
the condenser having a perpendicular configuration with the first plurality of cooling plates and the second plurality of cooling plates that have side surfaces which are perpendicular to outer opposite side walls of the multiport tubes;
the first plurality of cooling plates having their outer edges protruding out from a channel space in a first direction having a first inner edge attached to a first base attached to and extending along first outer side walls of the multiport tubes by brazing;
the second plurality of cooling plates having their outer edges protruding out from the channel space in a second direction having a second inner edge attached to a second base attached to and extending along second outer side walls of the multiport tubes by brazing;
the first plurality of cooling plates and the second plurality of cooling plates being attached to each other via being attached to the multiport tubes by brazing without using any other fasteners to connect the first plurality of cooling plates and the second plurality of cooling plates;
each of the plurality of multiport tubes being sandwiched between the first plurality of cooling plates and the second plurality of cooling plates with a corresponding outermost multiport tube among the multiport tubes being exposed by a corresponding slit formed between a corresponding outermost cooling plate among the first plurality of cooling plates and a corresponding outermost cooling plate among the second plurality of cooling plates and extending between the first manifold and second manifold; and
the fan being configured to generate a fan assisting airflow between the cooling plates along the flow path in a direction from the fluid outlet towards the fluid inlet.

7. The condenser of claim 6, wherein:
the first base is attached to and extending along the first outer side walls of the multiport tubes on a first side of the multiport tubes; and the second base is attached to and extending along the second outer side walls of the multiport tubes on a second side of the multiport tubes opposite the first side of the multiport tubes.

* * * * *